US011638313B1

United States Patent
Caira et al.

(10) Patent No.: US 11,638,313 B1
(45) Date of Patent: Apr. 25, 2023

(54) METHOD AND SYSTEM FOR AUTOMATIC COUPLING OF BLUETOOTH DEVICES

(71) Applicant: HCL Technologies Italy S.p.A., Vimodrone (IT)

(72) Inventors: Maria Teresa Caira, Rome (IT); Filippo Sorino, Rome (IT); Pasquale Peluso, Rome (IT); Alessandro D'Angeli, Rome (IT); Valentina Fusco, Rome (IT); Giuseppe Longobardi, Rome (IT)

(73) Assignee: HCL Technologies Italy S.p.A., Milan (IT)

( * ) Notice: Subject to any disclaimer, the term of this patent is extended or adjusted under 35 U.S.C. 154(b) by 0 days.

(21) Appl. No.: 17/536,150

(22) Filed: Nov. 29, 2021

(51) Int. Cl.
*H04W 76/10* (2018.01)
*H04W 4/80* (2018.01)

(52) U.S. Cl.
CPC ............ *H04W 76/10* (2018.02); *H04W 4/80* (2018.02)

(58) Field of Classification Search
CPC ............................... H04W 76/10; H04W 4/80
USPC ........................................................ 455/41.2
See application file for complete search history.

(56) References Cited

U.S. PATENT DOCUMENTS

| 8,295,766 | B2 | 10/2012 | Zimbric et al. |
| 9,154,218 | B2 | 10/2015 | Cha |
| 9,301,087 | B1 | 3/2016 | Pappas et al. |
| 2007/0238475 | A1 | 10/2007 | Goedken |
| 2015/0312703 | A1 | 10/2015 | Maldari et al. |
| 2016/0241698 | A1 | 8/2016 | Kim |

FOREIGN PATENT DOCUMENTS

| WO | 2009032571 A1 | 3/2009 |
| WO | 2020211733 A1 | 10/2020 |

*Primary Examiner* — Eugene Yun (57) ABSTRACT

A method and system for automatically coupling Bluetooth devices is disclosed. In some embodiments, the method includes identifying a plurality of Bluetooth devices within a predefined discoverable range of a computing device; identifying one or more current applications running on the computing device; determining a plurality of connection parameters associated with the computing device; assigning a confidence score to each of the plurality of Bluetooth devices based on a rule engine; iteratively generating a priority list by arranging the plurality of Bluetooth devices in an order of connection preference based on assigned confidence scores; coupling at least one Bluetooth device from the plurality of Bluetooth devices with the computing device based on the priority list generated iteratively.

20 Claims, 6 Drawing Sheets

METHOD AND SYSTEM FOR AUTOMATIC COUPLING OF BLUETOOTH DEVICES

TECHNICAL FIELD

Generally, the invention relates to wireless communication systems. More specifically, the invention relates to method and system for automatic coupling of Bluetooth devices.

BACKGROUND

Various electronic and communication devices are designed for wireless communication. These electronic and communication devices, for example, may include mobile phones, laptops, air-pods, smart watches, keyboards, and the like. Some of these devices may be designed for short range wireless communication, for example, via Bluetooth wireless technology, which is available in most of the electronic and communication devices. Bluetooth, as a wireless technology, is easy to use and enables fast connection with other devices within a predefined communication range/radius.

During a first-time connection, a password, a code, or request might be generated. Once two devices are allowed to connect, the devices may become associated. Every time these two devices are within the communication range, they may automatically connect. However, when several associated devices are present within the communication range, there might be a possibility of an unwanted connection. Therefore, one has to disable the Bluetooth when not needed or in order to disconnect a device and enable the Bluetooth when an appropriate device is available within the communication range.

Therefore, there is a need to develop a device which may automatically couple Bluetooth devices based on requirements

SUMMARY OF INVENTION

In one embodiment, a method for automatically coupling Bluetooth devices is disclosed. The method may include identifying a plurality of Bluetooth devices within a predefined discoverable range of a computing device. It should be noted that the plurality of Bluetooth devices may be associated with the computing device. The method may further include identifying one or more current applications running on the computing device. The method may further include determining a plurality of connection parameters associated with the computing device. The method may further include assigning a confidence score to each of the plurality of Bluetooth devices based on a rule engine. The rule engine may include a plurality of rules based on the one or more current applications, the plurality of connection parameters, historic usage patterns, and user preferences. The method may further include iteratively generating a priority list by arranging the plurality of Bluetooth devices in an order of connection preference based on assigned confidence scores. The method may further include coupling at least one Bluetooth device from the plurality of Bluetooth devices with the computing device, based on the priority list generated iteratively.

In another embodiment, a system for automatically coupling Bluetooth devices is disclosed. The system may include a processor and a memory communicatively coupled to the processor. The memory may store processor-executable instructions, which, on execution, may cause the processor to identify a plurality of Bluetooth devices within a predefined discoverable range of a computing device. It should be noted that the plurality of Bluetooth devices is associated with the computing device. The processor-executable instructions, on execution, may further cause the processor to identify one or more current applications running on the computing device. The processor-executable instructions, on execution, may further cause the processor to determine a plurality of connection parameters associated with the computing device. The processor-executable instructions, on execution, may further cause the processor to assign a confidence score to each of the plurality of Bluetooth devices based on a rule engine. The rule engine may include a plurality of rules based on the one or more current applications, the plurality of connection parameters, historic usage patterns, and user preferences. The processor-executable instructions, on execution, may further cause the processor to iteratively generate a priority list by arranging the plurality of Bluetooth devices in an order of connection preference based on assigned confidence scores. The processor-executable instructions, on execution, may further cause the processor to couple at least one Bluetooth device from the plurality of Bluetooth devices with the computing device, based on the priority list generated iteratively.

In yet another embodiment, a non-transitory computer-readable medium storing computer-executable instruction for automatically coupling Bluetooth devices is disclosed. The stored instructions, when executed by a processor, may cause the processor to perform operations including identifying a plurality of Bluetooth devices within a predefined discoverable range of a computing device. It should be noted that the plurality of Bluetooth devices is associated with the computing device The operations may further include identifying one or more current applications running on the computing device. The operations may further include determining a plurality of connection parameters associated with the computing device. The operations may further include assigning a confidence score to each of the plurality of Bluetooth devices based on a rule engine. The rule engine may include a plurality of rules based on the one or more current applications, the plurality of connection parameters, historic usage patterns, and user preferences. The operations may further include iteratively generating a priority list by arranging the plurality of Bluetooth devices in an order of connection preference based on assigned confidence scores. The operations may further include coupling at least one Bluetooth device from the plurality of Bluetooth devices with the computing device, based on the priority list generated iteratively.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
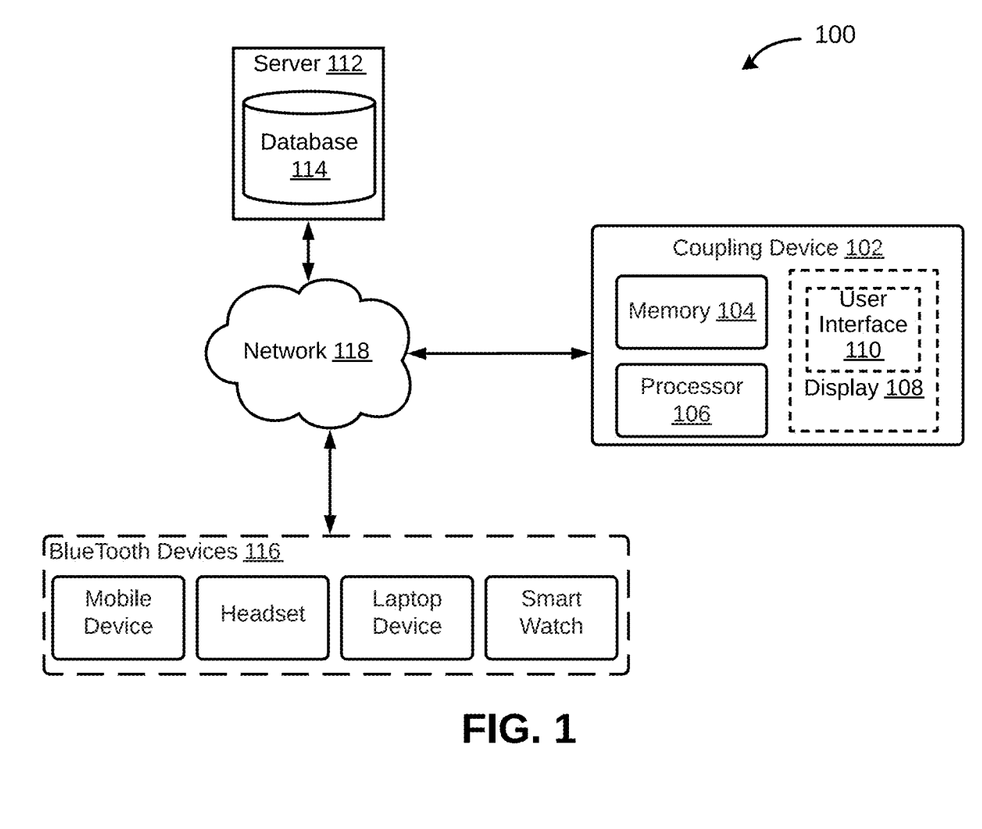
FIG. 1 is a block diagram illustrating a system for automatically coupling Bluetooth devices, in accordance with an embodiment.

Referring now to FIG. 1, a block diagram of a system 100 for automatically coupling Bluetooth devices is illustrated, in accordance with an embodiment. The system 100 may include a coupling device 102 that may identify a plurality of Bluetooth devices in proximity to an associated computing device, and may automatically connect the computing device to one of the identified Bluetooth devices. For example, for the computing device, a list of previously paired Bluetooth devices may include a headphone that may have been used to listen to music, a headset with microphone used for chats or WEB voice activities, air-buds used for phone calls, a single earpiece, and the like. When all the Bluetooth devices within the list are in proximity to the computing device, the coupling device 102 may generate a priority list by arranging the Bluetooth devices in an order of connection preference and based on the priority list may couple at least one Bluetooth device from the identified Bluetooth devices with the computing device. In some embodiments, the coupling device 102 may be the computing device itself.

Examples of the coupling device 102 may include, but are not limited to a smartphone, a laptop, a headset, a headphone, air pods, a mobile phone, a smart watch, smart-band, a smart wearable, or any Bluetooth enabled device. The coupling device 102 may include a memory 104, a processor 106, and a display 108. The display 108 may further include a user interface 110. A user, or an administrator may interact with the coupling device 102 and vice versa through the display 108. By way of an example, the display 108 may be used to display results of analysis performed by the coupling device 102 (such as, for displaying nearby Bluetooth devices within the predefined discoverable range of the computing device, displaying priority lists, and the like), to the user. By way of another example, the user interface 110 may be used by the user to provide inputs to the coupling device 102. For example, rules may be modified by the user using the user interface 110. Thus, for example, in some embodiments, the coupling device 102 may ingest information provided by the user or the administrator via the user interface 110. Further, for example, in some embodiments, the coupling device 102 may render results to the user or the administrator via the user interface 110.

The memory 104 may store instructions that, when executed by the processors 106, may cause the processors 106 to automatically couple at least one Bluetooth device from the Bluetooth devices with the computing device. As will be described in greater detail in conjunction with FIG. 2 to FIG. 8, in order to couple the Bluetooth devices, the processor 106 in conjunction with the memory 104 may perform various functions including identifying a plurality of Bluetooth devices, identifying running current applications, determining a plurality of connection parameters, assigning a confidence scores, generating a priority list, and the like.

The memory 104 may also store various data (e.g. the priority list, rules, connection parameters, historical usage patterns, user preferences etc.) that may be captured, processed, and/or required by the coupling device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Further, the coupling device 102 may interact with a server 112 or Bluetooth devices 116 via a communication network 118 for sending and receiving various data. For communication with the Bluetooth devices 116, communication network 118 may be Bluetooth. For communication with the server 112, the communication network 118, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

By way of an example, in some embodiments, the coupling device 102 may receive information from the server 112 or the Bluetooth devices 116. The server 112 may further include a database 114, which may store information such as, generated priority list, revised priority list, rules, user preferences, or other such similar information. Further, the Bluetooth devices 116 may include, but may not be limited to a desktop, a laptop, a notebook, a netbook, a tablet, a smartphone, a remote server, a mobile phone, a smartwatch, another computing system/device, or any Bluetooth enabled device.

Figure 2:
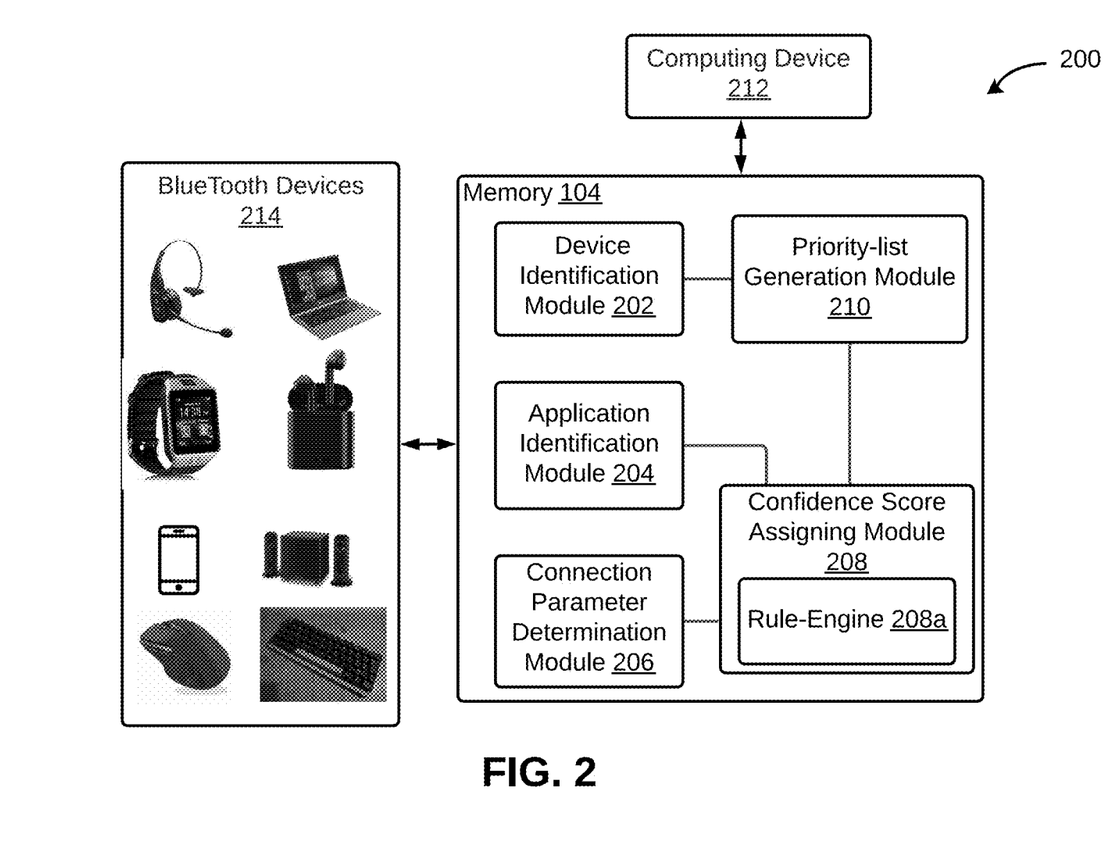
FIG. 2 is a functional block diagram of various modules within a memory of a coupling device configured to automatically couple Bluetooth devices, in accordance with an embodiment.

Referring now to FIG. 2, a block diagram of various modules within the memory 104 of the coupling device 102 configured to automatically couple Bluetooth devices is illustrated, in accordance with an embodiment. In order to automatically couple the Bluetooth devices, the memory 104 may include a device identification module 202, an application identification module 204, a connection parameter determination module 206, a confidence score assigning module 208, and a priority list generation module 210. Further, the memory 104 may also include a data store to store various information and intermediate results generated by the modules 202-210. By way of an example, the modules 202-210 may perform various operations in order to couple a computing device 212 to at least one of a plurality of Bluetooth devices 214. FIG. 2 is explained in conjunction with FIG. 1.

The device identification module 202 may be configured to identify a plurality of Bluetooth devices 214 within a predefined discoverable range of a computing device 212. For example, in some embodiments, the predefined discoverable range may be 10 meters. It may be noted that the plurality of Bluetooth devices 214 may be associated with the computing device 212. In other words, the plurality of Bluetooth devices 214 may be previously paired with the computing device 212. The plurality of Bluetooth devices 214 may include at least one of a smartphone, a laptop, a headset, a headphone, air pods, a mobile phone, a keyboard, a smart watch, a smart-band, a smart wearable, or any Bluetooth enabled device. In some embodiments, a category from a plurality of categories may be identified for each of the plurality of Bluetooth devices 214. Each of the plurality of categories may correspond to a type associated with the plurality of Bluetooth devices.

In some embodiments, the plurality of Bluetooth devices 214 may be of different types of Bluetooth devices. In some other embodiments, two or more of the plurality of Bluetooth devices 214 may be of the same category. For example, two Bluetooth devices that are used to listen to music may belong to the same category. The coupling device 102 has the capability or is configured to identify an appropriate Bluetooth device even when the plurality of Bluetooth devices 214 belong to the same category. In some embodiments a statistical linear classification method, such as logistical regression may be used to predict the category of a Bluetooth device.

It should be noted that the coupling device 102 may accumulate data based on regular usage of a Bluetooth device and may recognize consistent patterns of usage. Further, the data may be updated to its configuration, which is available for user management and editing.

The application identification module 204 may be configured to identify one or more applications running on the computing device 212. For example, in some embodiments, the application identification module 204 may identify applications such as a music player, a web browser music link, or a radio, which are executing on the computing device 212 for listen to music. In some embodiments, for example, the application identification module 204 may identify running applications such as, SKYPE, messenger, WHATSAPP, ZOOM, VIBER, and other applications used for calling and chatting. In some embodiments, the application identification module 204 may identify other running applications used for different purposes.

The connection parameter determination module 206 may be configured to determine a plurality of connection parameters associated with the computing device 212. The plurality of connection parameters may include at least one of a time of usage, a geolocation, a running application type, available wireless connections, history of usage, and other such similar information. For example, in some embodiments, the connection parameter determination module 206 may determine time and duration for which the computing device 212 was previously coupled with a particular Bluetooth device. In another example, the connection parameter determination module 206 may determine a location of the computing device 212. Other than Bluetooth connections, the available wireless connections may include at least one of Wireless Fidelity (Wi-Fi) connections or Near Field Communication (NFC) connections.

The confidence score assigning module 208 may be configured to assign a confidence score to each of the plurality of Bluetooth devices 214. In particular, the confidence score assigning module 208 may further include a rule engine 208a, as illustrated in FIG. 2, for assigning the confidence scores. The rule engine 208a may include a plurality of rules based on the one or more current applications, the plurality of connection parameters, historic usage patterns, and user preferences. The plurality of rules may include one or more associations between one or more of the one or more running applications, user preferences, or the plurality of connection parameters. In some embodiments, each of the plurality of rules may be validated based on a user input. Additionally, in some embodiments, at least one rule from the plurality of rules may be modified in response to the at least one rule failing validation.

Further, in some embodiments, an established connection between the computing device 212 and a Bluetooth device from the plurality of Bluetooth device 214 may be terminated when the established connection is incompatible based on the plurality of rules.

The priority-list generation module 210 may be configured to iteratively generate a priority list. In some embodiments, a priority list may be generated by arranging the plurality of Bluetooth devices 214 in an order of connection preference. It should be noted that the order may be determined based on the assigned confidence scores. Further, based on the priority list, at least one Bluetooth device from the plurality of Bluetooth devices 214 may be coupled with the computing device 212.

In some embodiments, the computing device 212 may be automatically connected to a first Bluetooth device. It should be noted that the first Bluetooth device may have highest priority in the priority list. For example, in some embodiments, a headphone may have the highest priority, therefore the headphone may be the first Bluetooth device. In some other embodiments, smart watch may have the highest priority, thus the first Bluetooth device may be the smartwatch. Similarly, air pods with the highest priority may be considered as the first Bluetooth device.

Further, in some embodiments, the connection of the computing device 212 may be switched from the connected first Bluetooth device to a second Bluetooth device automatically, based on a revised priority list. For example, in a next iteration, order of connection preference may change for the plurality of Bluetooth devices 214, which may lead to generation of the revised priority list. In the revised priority list, highest priority Bluetooth device may not be same as the highest priority Bluetooth device of the previous priority list. Here, in the revised priority list, a Bluetooth device with the highest priority may be referred to as the second Bluetooth device. By way of an example, in an initial priority list highest priority Bluetooth device may be a High Definition (HD) headphone based on the current geographical location of the user being Home and an application running on the computing device 212 being YOUTUBE. Further, in a revised priority list the highest priority Bluetooth device may be AIR PODS based on the current geographical location of the user being Office and an application running on the computing device 212 being ZOOM. In that case, the coupling device 102 may switch the connection of the computing device 212 from the HD headphone to the AIR PODS.

Further, the coupling device 102 is also able to arrange same categories of Bluetooth devices in an order of priority. For example, consider a situation where two Bluetooth enabled keyboards (i.e., a Keyboard 1 and a Keyboard 2), and a headphone are available within a discoverable range of a mobile device. Usually, the mobile device is used by two different users (i.e., a first user, and a second user). The first user connects the keyboard 1 and the second user connects the keyboard 2 to the mobile device. When one of the users open an Email Application in the mobile phone, various connection parameters (such as time of using the Email Application, and location of the mobile device) may be determined by the mobile device or associated coupling device. For example, in this particular case, time of using the Email Application is day time. The Keyboard 2 is always connected to the mobile device in the day time, while the keyboard 1 is always connected in evening. Similarly, location and other connection parameters may also be other factors that influence the connection preferences. Further, based on the rule engine, a confidence score may be assigned to each of the Keyboard 1, the Keyboard 2, and the headphone. It should be noted that the rule engine includes a plurality of rules based on the one or more current applications, the plurality of connection parameters, historic usage patterns, and user preferences. In this case, priorities should be keyboards as the Email Application is currently running. However, the Keyboard 2 may have higher confidence score than the keyboard 1. Therefore, the Keyboard 2 may be the highest priority device in a priority list generated by the mobile device or the associated coupling device, as the other factors are also considered. The headphone may have least priority in the priority list. This priority list may be iteratively generated by the mobile device by arranging the Bluetooth devices in an order of connection preferences based on assigned confidence scores. In the evening, for the same case, the highest priority device may be the Keyboard 1.

By way of another example, the coupling device 102 may identify "Phone Dialer" as the currently running application. Further, the coupling device 102 may correlate the currently running application, i.e., the "Phone Dialer," with the connection parameters such as time and location of the computing device and available nearby Bluetooth devices. Here, consideration of the connection parameters i.e., location, time, and available Bluetooth devices may influence the decision. The priority list generated only based on the currently running application, i.e., "Phone dialer," may be different from the priority list that is generated by considering the currently running application, the correction parameters, the history of usage, the user preferences and the usage patterns in combination.

Further, when the coupling device detects a "known" situation, it reacts and automatically pairs the proper device, disconnecting the previous connected one, if any.

It should be noted that the system 100 and associated coupling device 102 may be implemented in programmable hardware devices such as programmable gate arrays, programmable array logic, programmable logic devices, or the like. Alternatively, the system 100 and coupling device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed to couple the Bluetooth devices. For example, the exemplary system 100 and the coupling device 102 may automatically couple the Bluetooth devices, by the process discussed herein. In particular, as will be appreciated by those of ordinary skill in the art, control logic and/or automated routines for performing the techniques and steps described herein may be implemented by the system 100 and the coupling device 102 either by hardware, software, or combinations of hardware and software. For example, suitable code may be accessed and executed by the processor 106 in the coupling device 102 to perform some or all of the techniques described herein. Similarly, application specific integrated circuits (ASICs) configured to perform some or all the processes described herein may be included in the processor 106 in the coupling device 102.

Figure 3:
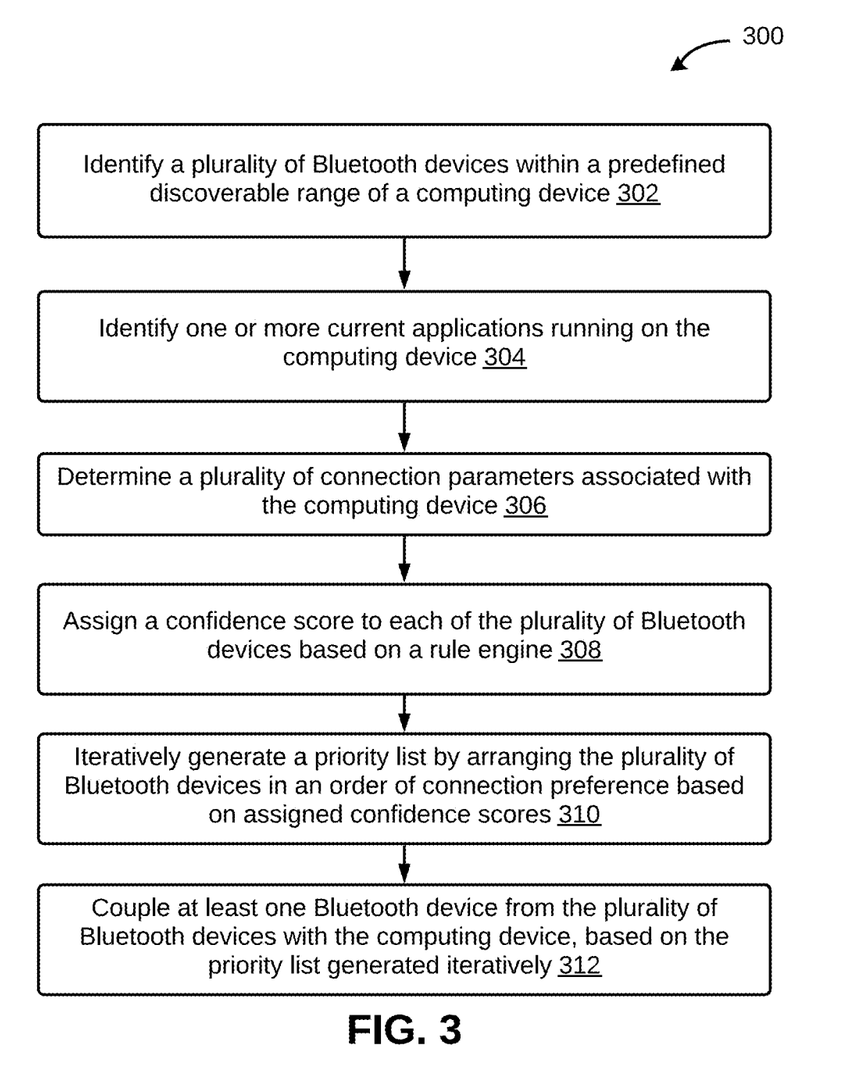
FIG. 3 is a flowchart of a method for automatically coupling Bluetooth devices, in accordance with an embodiment.

Referring now to FIG. 3, a method for automatically coupling Bluetooth devices is depicted via a flowchart 300, in accordance with an embodiment. Each step of the method may be executed by the modules 202-210 of the coupling device 102. FIG. 3 is explained in conjunction with FIG. 1.

At step 302, a plurality of Bluetooth devices (such as the plurality of Bluetooth devices 214) within a predefined discoverable range of a computing device (such as, the computing device 212) may be identified. A device identification module (same as the device identification module 202) may be responsible to identify the plurality of Bluetooth devices, which has already been explained in conjunction with FIG. 1. It should be noted that the plurality of Bluetooth devices may be associated with the computing device. Thereafter, at step 304, one or more current applications running on the computing device may be identified. To identify the one or more current applications, an application identification module (same as the application identification module 204) may be employed.

Further, at step 306, a plurality of connection parameters associated with the computing device may be determined. A connection parameters determination module (analogous to the connection parameters determination module 206) may be used. The plurality of connection parameters may include at least one of time of usage, geolocation, a running application type, available wireless connections, and history of usage. The available wireless connections may include at least one of Bluetooth connections, Wireless Fidelity (Wi-Fi) connections, or Near Field Communication (NFC) connections.

At step 308, a confidence score may be assigned to each of the plurality of Bluetooth devices based on a rule engine (similar to the rule engine 208a). The rule engine may include a plurality of rules based on the one or more current applications, the plurality of connection parameters, historic usage patterns, and user preferences. It should be noted that the plurality of rules may include one or more associations between one or more of the one or more running applications, user preferences, or the plurality of connection parameters.

After that, at step 310, a priority list may be generated iteratively. The coupling device may include a priority list generation module (same as the priority list generation module 210) for generating the priority list. In some embodiments, to generate the priority list, the plurality of Bluetooth devices may be arranged in an order of connection preference. Also, it should be noted that assigned confidence scores may be considered for arranging the plurality of Bluetooth devices in an order of connection preference. In some embodiments, the iterative generation of the priority list may be a result of change in the one or more current applications and the plurality of connection parameters. As a result of the plurality of rules, a change in the one or more current applications and the plurality of connection parameters, may result in assigning of different confidence scores to each of the plurality of Bluetooth devices.

At step 312, at least one Bluetooth device from the plurality of Bluetooth devices may be coupled with the computing device based on the iteratively generated priority list. In other words, the at least one Bluetooth device may keep on changing at each iteration, based on a revised priority list generated. For example, at a first iteration, order of connection preference in the priority list may be air pods, a keyboard, and then a mobile phone. Further, in the next iteration, the order in the revised priority list may change to the mobile phone, the keyboard, and the air pods. Also, it depends on the available Bluetooth devices within the discoverable range of the computing device. In the next iteration, if the keyboard is not within the range of the computing device, the revised priority list may include only the mobile phone and the air pods.

By way of an example, consider a scenario where the user carries a mobile phone. The user may be listening to music using a headphone. An Application running in the mobile phone may be a "Music Player." The headphone may be connected to the mobile phone via Bluetooth. Now, when the user enters a car, the mobile phone may be automatically disconnected from the headphone and may get connected to the music system of the car. Further, if the user opens a calling Application in the mobile phone the music system may be disconnected and the headphone may get connected to the mobile phone. Similarly, if there are other persons (friends of the user) along with the user, the speakerphone may be enabled based on the rules. The presence of other persons may be detected based on ambient noise as received by the user device or the coupling device. The rules may be framed based on the current applications, the plurality of connection parameters, historic usage patterns, and user preferences.

In another example, consider a situation when a headset without microphone is connected to a user's mobile and a calling application is opened in the mobile phone to receive a call. The coupling device may switch the connection to a compatible Bluetooth device within the discoverable range of the mobile automatically, as the headset without microphone is not compatible for calling purposes. For example, the mobile may be to connected to the smart watch if the user is walking outside.

Further, in a scenario, a user may open an Email Application to read a mail while listing to music using a headset. In this case, a switch from the headset to the keyboard may not be immediate, as the user may want to continue to listen music while reading or typing emails using internal touch virtual keyboard. The coupling device 102 may determine the connection parameters, such as time of opening the Email Application, may extract historical usage patterns and user's preferences, and based on that priorities may be assigned to the headset and the keyboard.

It should be noted that the coupling device 102 may accumulate data based on regular usage of a Bluetooth device and may recognize consistent patterns of usage. Further, the data may be updated to its configuration, which is available for user management and editing.

Figure 4:
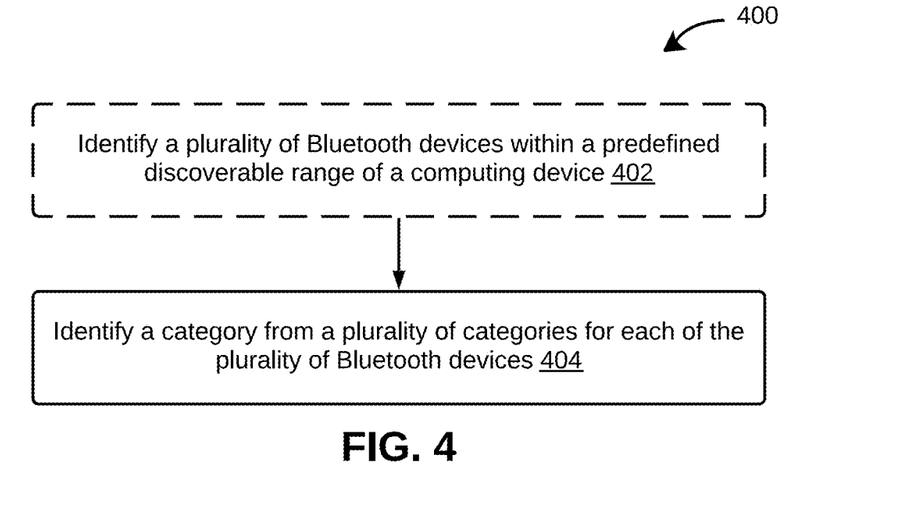
FIG. 4 is a flowchart of a method for identifying categories for Bluetooth devices, in accordance with an embodiment.

Referring now to FIG. 4, a method for identifying categories for Bluetooth devices is depicted via a flowchart 400, in accordance with an embodiment. FIG. 4 is explained in conjunction with FIGS. 1-3. At step 402, a plurality of Bluetooth devices within a predefined discoverable range of a computing device may be identified. It should be noted that the plurality of Bluetooth devices is associated with the computing device. Thereafter, at step 404, a category from a plurality of categories for each of the plurality of Bluetooth devices may be identified. Each of the plurality of categories may correspond to a type associated with the plurality of Bluetooth devices.

In some embodiments a statistical linear classification method, such as logistical regression may be used to predict the category of a Bluetooth device.

Figure 5:
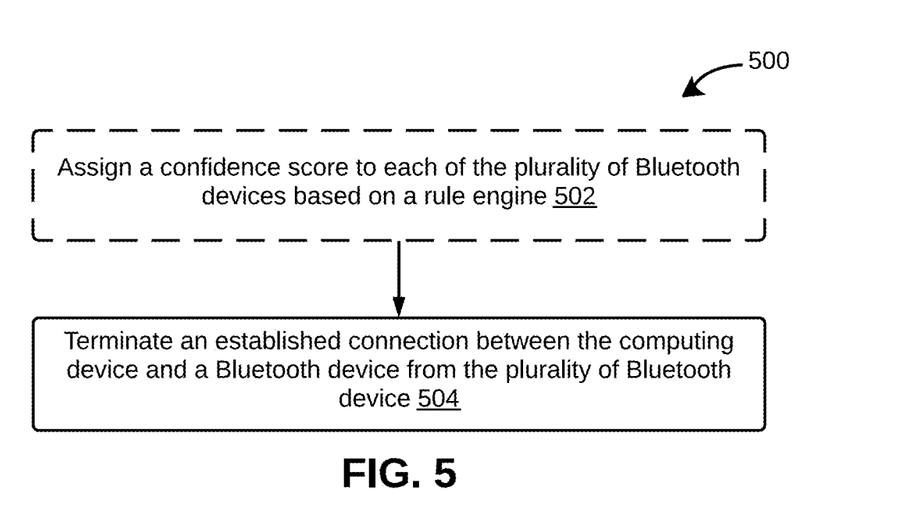
FIG. 5 is a flowchart of a method for terminating a connection between a computing device and a Bluetooth device, in accordance with an embodiment.

Referring now to FIG. 5, a method for terminating a connection between a computing device and a Bluetooth device is depicted via a flowchart 500, in accordance with an embodiment. FIG. 5 is explained in conjunction with FIGS. 1-4. At step 502, a confidence score may be assigned to each of the plurality of Bluetooth devices based on the rule engine. The rule engine may include a plurality of rules based on the one or more current applications, the plurality of connection parameters, historic usage patterns, and user preferences. After that, at step 504, an established connection between the computing device and a Bluetooth device from the plurality of Bluetooth device may be terminated, when the established connection is incompatible based on the plurality of rules.

Figure 6:
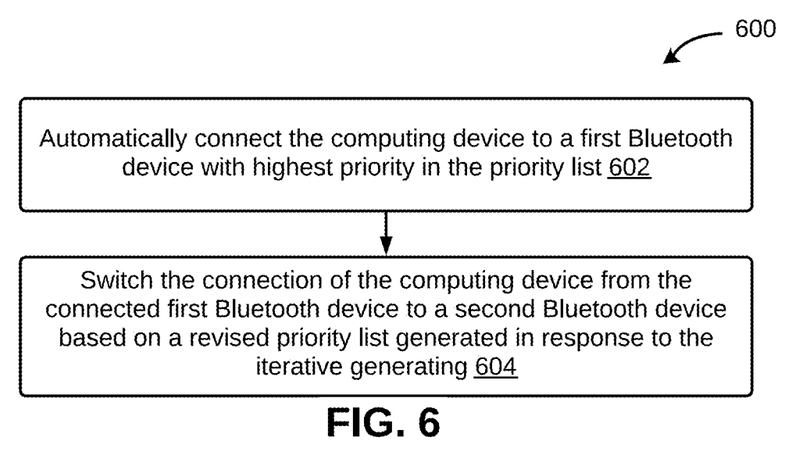
FIG. 6 is a flowchart of a method for coupling a computing device with a Bluetooth device, in accordance with an embodiment.

Referring now to FIG. 6, a method for coupling a computing device with a Bluetooth device based on iteratively generated priority list is depicted via a flowchart 600, in accordance with an embodiment. FIG. 6 is explained in conjunction with FIGS. 1-5. At step 602, the computing device may be automatically connected to a first Bluetooth device with highest priority in the priority list. At step 604, the connection of the computing device may be switched from the connected first Bluetooth device to a second Bluetooth device based on a revised priority list generated in response to the iterative generating. It should be noted that the second Bluetooth device has the highest priority in the revised priority list.

Figure 7:
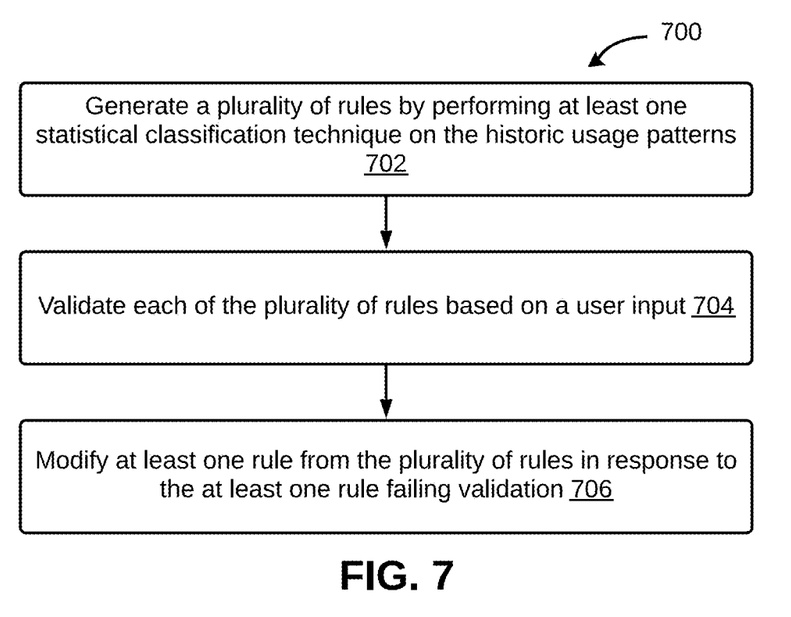
FIG. 7 is a flowchart of a method for modifying a rule from a plurality of rules, in accordance with an embodiment.

Referring now to FIG. 7, a method for modifying a rule from a plurality of rules is depicted via a flowchart 700, in accordance with an embodiment. FIG. 7 is explained in conjunction with FIGS. 1-6. At step 702, the plurality of rules may be generated. In some embodiments, at least one statistical classification technique on the historic usage patterns may be performed to generate the rules. It should be noted that the plurality of rules may include one or more associations between one or more of the one or more running applications, user preferences, or the plurality of connection parameters.

At step 704, each of the plurality of rules may be validated. It should be noted that validation may be performed based on a user input. Further, at step 706, at least one rule from the plurality of rules may be modified in response to the at least one rule failing validation.

The coupling device 102 also has the capability to define a black list of devices, and a white list of devices for each application. Therefore, for a specific application, the coupling device 102 may never attempt to connect to that device even if there is a possibility to connect to a Bluetooth device. For example, a speaker phone is active in a car but the user may not want to use speaker phone for SHAZAM Application or GOOGLE ASSISTANT.

Figure 8:
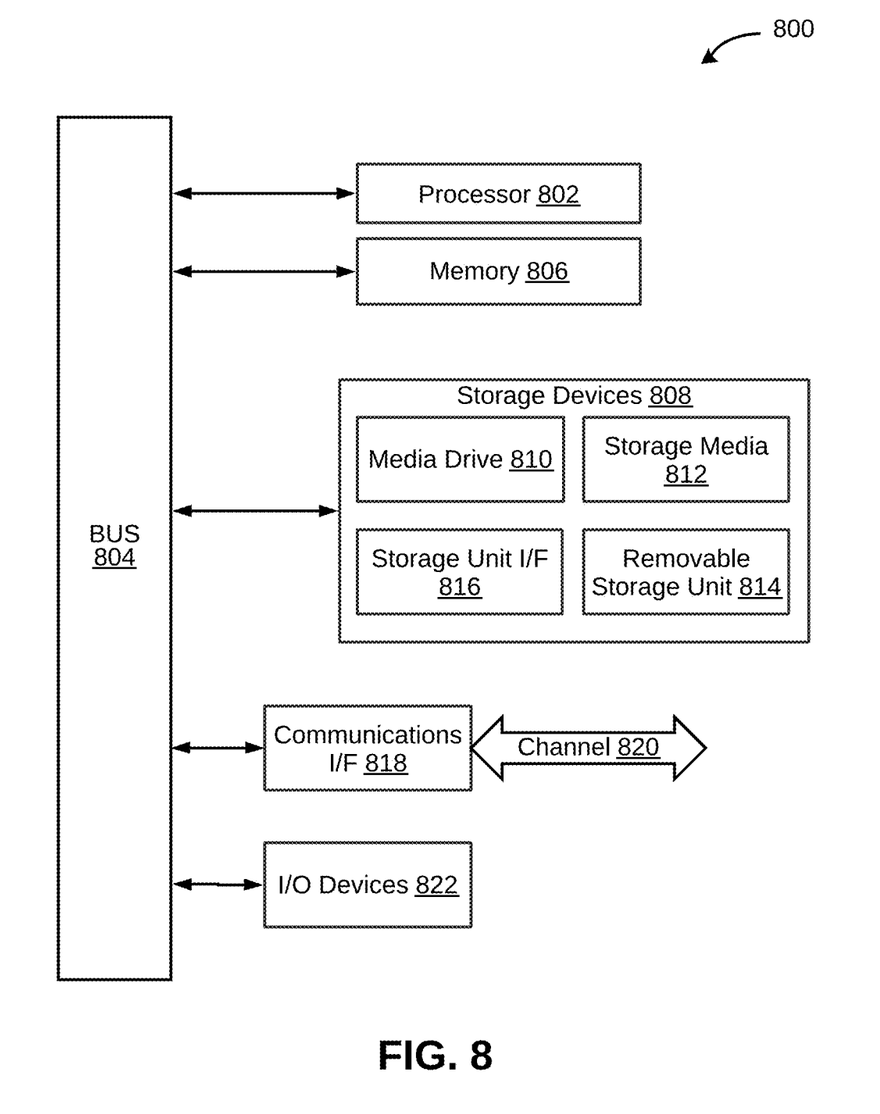
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, an exemplary computing system 800 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 800 may represent, for example, a user device such as a desktop, a laptop, a mobile phone, personal entertainment device, DVR, and so on, or any other type of special or general-purpose computing device as may be desirable or appropriate for a given application or environment. The computing system 800 may include one or more processors, such as a processor 802 that may be implemented using a general or special purpose processing engine such as, for example, a microprocessor, microcontroller or other control logic. In this example, the processor 802 is connected to a bus 804 or other communication medium. In some embodiments, the processor 802 may be an Artificial Intelligence (AI) processor, which may be implemented as a Tensor Processing Unit (TPU), or a graphical processor unit, or a custom programmable solution Field-Programmable Gate Array (FPGA).

The computing system 800 may also include a memory 806 (main memory), for example, Random Access Memory (RAM) or other dynamic memory, for storing information and instructions to be executed by the processor 802. The memory 806 also may be used for storing temporary variables or other intermediate information during execution of instructions to be executed by the processor 802. The computing system 800 may likewise include a read only memory ("ROM") or other static storage device coupled to bus 804 for storing static information and instructions for the processor 802.

The computing system 800 may also include a storage device 808, which may include, for example, a media drives 810 and a removable storage interface. The media drive 810 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 806 may include, for example, a hard disk, magnetic tape, flash drive, or other fixed or removable medium that is read by and written to by the media drive 820. As these examples illustrate, the storage media 812 may include a computer-readable storage medium having stored there in particular computer software or data.

In alternative embodiments, the storage devices 808 may include other similar instrumentalities for allowing computer programs or other instructions or data to be loaded into the computing system 800. Such instrumentalities may include, for example, a removable storage unit 814 and a storage unit interface 816, such as a program cartridge and cartridge interface, a removable memory (for example, a flash memory or other removable memory module) and memory slot, and other removable storage units and interfaces that allow software and data to be transferred from the removable storage unit 814 to the computing system 800.

The computing system 800 may also include a communications interface 818. The communications interface 818 may be used to allow software and data to be transferred between the computing system 800 and external devices. Examples of the communications interface 818 may include a network interface (such as an Ethernet or other NIC card), a communications port (such as for example, a USB port, a micro USB port), Near field Communication (NFC), etc. Software and data transferred via the communications interface 818 are in the form of signals which may be electronic, electromagnetic, optical, or other signals capable of being received by the communications interface 818. These signals are provided to the communications interface 818 via a channel 820. The channel 820 may carry signals and may be implemented using a wireless medium, wire or cable, fiber optics, or other communications medium. Some examples of the channel 820 may include a phone line, a cellular phone link, an RF link, a Bluetooth link, a network interface, a local or wide area network, and other communications channels.

The computing system 800 may further include Input/Output (I/O) devices 822. Examples may include, but are not limited to a display, keypad, microphone, audio speakers, vibrating motor, LED lights, etc. The I/O devices 822 may receive input from a user and also display an output of the computation performed by the processor 802. In this document, the terms "computer program product" and "computer-readable medium" may be used generally to refer to media such as, for example, the memory 806, the storage devices 808, the removable storage unit 814, or signal(s) on the channel 820. These and other forms of computer-readable media may be involved in providing one or more sequences of one or more instructions to the processor 802 for execution. Such instructions, generally referred to as "computer program code" (which may be grouped in the form of computer programs or other groupings), when executed, enable the computing system 800 to perform features or functions of embodiments of the present invention.

In an embodiment where the elements are implemented using software, the software may be stored in a computer-readable medium and loaded into the computing system 800 using, for example, the removable storage unit 814, the media drive 810 or the communications interface 818. The control logic (in this example, software instructions or computer program code), when executed by the processor 802, causes the processor 802 to perform the functions of the invention as described herein.

Various embodiments provide method and system for automatically coupling the Bluetooth devices. The disclosed method and system may help to automate the process of coupling the Bluetooth devices. The coupling device described in the present disclosure may consider various parameters such as time of usage, geolocation, a running application type, available wireless connections, and history of usage for coupling. Thus, even in the presence of Bluetooth devices of similar categories, the coupling device is capable of selecting an appropriate Bluetooth device from various Bluetooth devices in proximity to the computing device. Further, the coupling device provides a facility of rule validation by the user and modification of the rules when the validation is unsuccessful. Also, the coupling device avoid a continuous switch from one device to another as it generates priority list iteratively, and based on that switches from one device to another device. Thus, when two devices are incompatible, the coupling device may prompt to switch to another compatible device.

The disclosed coupling device may be implemented as an Application or may be directly embedded into the Operating Systems, such as Android or IOS, as part of the Bluetooth devices management.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for automatically coupling Bluetooth devices, the method comprising:
    identifying, by a coupling device, a plurality of Bluetooth devices within a predefined discoverable range of a computing device, wherein the plurality of Bluetooth devices is associated with the computing device;
    identifying, by the coupling device, one or more current applications running on the computing device;
    determining, by the coupling device, a plurality of connection parameters associated with the computing device;
    assigning, by the coupling device, a confidence score to each of the plurality of Bluetooth devices based on a rule engine, wherein the rule engine comprises a plurality of rules based on the one or more current applications, the plurality of connection parameters, historic usage patterns, and user preferences;
    iteratively generating, by the coupling device, a priority list by arranging the plurality of Bluetooth devices in an order of connection preference based on assigned confidence scores; and
    coupling, by the coupling device, at least one Bluetooth device from the plurality of Bluetooth devices with the computing device, based on the priority list generated iteratively.

2. The method of claim 1, further comprising identifying a category from a plurality of categories for each of the plurality of Bluetooth devices, wherein each of the plurality of categories correspond to a type associated with the plurality of Bluetooth devices.

3. The method of claim 1 further comprising terminating an established connection between the computing device and a Bluetooth device from the plurality of Bluetooth device, when the established connection is incompatible based on the plurality of rules.

4. The method of claim 1, wherein coupling the at least one Bluetooth device comprises automatically connecting the computing device to a first Bluetooth device with highest priority in the priority list.

5. The method of claim 4, wherein automatically connecting comprises switching the connection of the computing device from the connected first Bluetooth device to a second Bluetooth device based on a revised priority list generated in response to the iterative generating, wherein the second Bluetooth device has the highest priority in the revised priority list.

6. The method of claim 1, wherein the plurality of connection parameters comprises at least one of time of usage, geolocation, a running application type, available wireless connections, and history of usage, and wherein the available wireless connections comprise at least one of Bluetooth connections, Wireless Fidelity (Wi-Fi) connections, or Near Field Communication (NFC) connections.

7. The method of claim 1, wherein the plurality of rules is generated by performing at least one statistical classification technique on the historic usage patterns.

8. The method of claim 7, wherein the plurality of rules comprises one or more associations between one or more of the one or more running applications, user preferences, or the plurality of connection parameters.

9. The method of claim 7, further comprising:
    validating each of the plurality of rules based on a user input; and
    modifying at least one rule from the plurality of rules in response to the at least one rule failing validation.

10. A system for automatically coupling Bluetooth devices, the device comprising:
    a processor; and
    a memory communicatively coupled to the processor, wherein the memory stores processor-executable instructions, which, on execution, causes the processor to:
        identify a plurality of Bluetooth devices within a predefined discoverable range of a computing device, wherein the plurality of Bluetooth devices is associated with the computing device;
        identify one or more current applications running on the computing device;
        determine a plurality of connection parameters associated with the computing device;

assign a confidence score to each of the plurality of Bluetooth devices based on a rule engine, wherein the rule engine comprises a plurality of rules based on the one or more current applications, the plurality of connection parameters, historic usage patterns, and user preferences;

iteratively generate a priority list by arranging the plurality of Bluetooth devices in an order of connection preference based on assigned confidence scores; and couple at least one Bluetooth device from the plurality of Bluetooth devices with the computing device, based on the priority list generated iteratively.

11. The system of claim 10, wherein the processor-executable instructions cause the processor to identify a category from a plurality of categories for each of the plurality of Bluetooth devices, wherein each of the plurality of categories correspond to a type associated with the plurality of Bluetooth devices.

12. The system of claim 10, wherein the processor-executable instructions cause the processor to terminate an established connection between the computing device and a Bluetooth device from the plurality of Bluetooth device, when the established connection is incompatible based on the plurality of rules.

13. The system of claim 10, wherein the processor-executable instructions cause the processor to couple the at least one Bluetooth device by automatically connecting the computing device to a first Bluetooth device with highest priority in the priority list.

14. The system of claim 13, wherein the processor-executable instructions cause the processor to automatically connect the computing device by switching the connection of the computing device from the connected first Bluetooth device to a second Bluetooth device based on a revised priority list generated in response to the iterative generating, wherein the second Bluetooth device has the highest priority in the revised priority list.

15. The system of claim 10, wherein the plurality of connection parameters comprises at least one of time of usage, geolocation, a running application type, available wireless connections, history of usage, and wherein the available wireless connections comprise at least one of Bluetooth connections, Wireless Fidelity (Wi-Fi) connections, or Near Field Communication (NFC) connections.

16. The system of claim 10, wherein the plurality of rules is generated by performing at least one statistical classification technique on the historic usage patterns.

17. The system of claim 16, wherein the plurality of rules comprises one or more associations between one or more of the one or more running applications, user preferences, or the plurality of connection parameters.

18. The system of claim 16, wherein the processor-executable instructions further cause the processor to:
validate each of the plurality of rules based on a user input; and
modify at least one rule from the plurality of rules in response to the at least one rule failing validation.

19. A non-transitory computer-readable medium storing computer-executable instructions for automatically coupling Bluetooth devices, the computer-executable instructions configured for:
identifying a plurality of Bluetooth devices within a predefined discoverable range of a computing device, wherein the plurality of Bluetooth devices is associated with the computing device;
identifying one or more current applications running on the computing device;
determining a plurality of connection parameters associated with the computing device;
assigning a confidence score to each of the plurality of Bluetooth devices based on a rule engine, wherein the rule engine comprises a plurality of rules based on the one or more current applications, the plurality of connection parameters, historic usage patterns, and user preferences;
iteratively generating a priority list by arranging the plurality of Bluetooth devices in an order of connection preference based on assigned confidence scores; and
coupling at least one Bluetooth device from the plurality of Bluetooth devices with the computing device, based on the priority list generated iteratively.

20. The non-transitory computer-readable medium of the claim 19, wherein the computer-executable instructions further configured for identifying a category from a plurality of categories for each of the plurality of Bluetooth devices, wherein each of the plurality of categories correspond to a type associated with the plurality of Bluetooth devices.

* * * * *